United States Patent
Strein (10) Patent No.: US 10,097,790 B2
(45) Date of Patent: *Oct. 9, 2018

(54) CARRIAGE OF PTP TIME REFERENCE DATA IN A REAL-TIME VIDEO SIGNAL

(71) Applicant: Disney Enterprises, Inc., Burbank, CA (US)

(72) Inventor: Michael J. Strein, Bohemia, NY (US)

(73) Assignee: Disney Enterprises, Inc., Burbank, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 15/071,065

(22) Filed: Mar. 15, 2016

(65) Prior Publication Data
US 2017/0272693 A1 Sep. 21, 2017

(51) Int. Cl.
| | |
|---|---|
| H04J 3/06 | (2006.01) |
| H04N 7/083 | (2006.01) |
| H04N 7/01 | (2006.01) |
| H04N 21/8547 | (2011.01) |
| H04N 21/2343 | (2011.01) |
| H04N 21/236 | (2011.01) |
| H04N 21/434 | (2011.01) |

(52) U.S. Cl.
CPC .......... *H04N 7/083* (2013.01); *H04J 3/0667* (2013.01); *H04N 7/01* (2013.01); *H04N 21/23602* (2013.01); *H04N 21/23614* (2013.01); *H04N 21/234309* (2013.01); *H04N 21/4342* (2013.01); *H04N 21/8547* (2013.01)

(58) Field of Classification Search
CPC .................... H04J 3/0667; H04N 21/23602
See application file for complete search history.

(56) References Cited

U.S. PATENT DOCUMENTS

| | | | | |
|---|---|---|---|---|
| 2010/0271488 | A1* | 10/2010 | Garcia | H04H 20/14 348/180 |
| 2011/0221958 | A1* | 9/2011 | Dachiku | G11B 27/036 348/468 |
| 2015/0168946 | A1* | 6/2015 | Duvvuri | G05B 19/41855 700/20 |
| 2016/0182176 | A1* | 6/2016 | Ramachandra | H04J 3/0661 370/429 |
| 2016/0301831 | A1* | 10/2016 | Meyer | H04N 5/04 |

OTHER PUBLICATIONS

Edwards, Thomas, "RTP Payload for SMPTE ST 291 Ancillary Data", Mar. 25, 2015.*
VSR Technical Recommendation TR-03 document ("Transport of Uncompressed Elementary Stream Media over IP", Nov. 12, 2015).*
Edwards, Thomas, "RTP Payload for SMPTE ST 291 Ancillary Data", Mar. 25, 2015 (Year: 2015).*
VSR Technical Recommendation TR-03 document ("Transport of Uncompressed Elementary Stream Media over IP", Nov. 12, 2015) (Year: 2015).*

* cited by examiner

*Primary Examiner* — Salvador E Rivas
(74) *Attorney, Agent, or Firm* — Patterson + Sheridan, LLP (57) ABSTRACT

Systems, methods, apparatuses, and computer program products which generate a Precision Time Protocol (PTP) timestamp associated with a first video frame of a serial digital interface (SDI) signal and insert the PTP timestamp into at least one of a Vertical Ancillary (VANC) data space and a Horizontal Ancillary (HANC) data space of the first video frame.

17 Claims, 7 Drawing Sheets

CARRIAGE OF PTP TIME REFERENCE DATA IN A REAL-TIME VIDEO SIGNAL

BACKGROUND

Field of the Disclosure

Embodiments disclosed herein relate to video production. More specifically, embodiments disclosed herein provide carriage of Precision Time Protocol (PTP) time reference data in a real-time video signal.

Description of the Related Art

The Precision Time Protocol (PTP) is defined by the Institute of Electrical and Electronics Engineers (IEEE®) 1588 standard and adopted by the Society of Motion Picture and Television Engineers® (SMPTE®) 2059. The PTP standard provides a timestamp that has 80 bits of precision and is accurate from the microsecond to the century. Generally, SMPTE 2059 is directed to leveraging PTP to provide timestamps for video data that is encapsulated in Internet Protocol (IP) packets. However, video often transitions from the IP domain to the video domain, and vice versa. Video data is stored in line and frame increments. Therefore, when the video transitions from being encapsulated in IP packets to a pure serial digital signal, the precision provided by PTP timestamps is lost. Therefore, a way to store and carry PTP data in a video signal is needed.

SUMMARY

In one embodiment, a method comprises generating a Precision Time Protocol (PTP) timestamp associated with a first video frame of a serial digital interface (SDI) signal, and inserting the PTP timestamp into at least one of a Vertical Ancillary (VANC) data space and a Horizontal Ancillary (HANC) data space of the first video frame.

In another embodiment, a computer-readable storage medium stores instructions which when executed by a processor performs an operation comprising receiving a first Internet Protocol (IP) packet comprising video data, generating a Precision Time Protocol (PTP) timestamp, and converting the video data to a serial digital interface (SDI) signal, wherein at least one of a Vertical Ancillary (VANC) data space and a Horizontal Ancillary (HANC) data space of a first video frame of the SDI signal includes the PTP timestamp.

In still another embodiment, an apparatus comprises logic configured to generate a Precision Time Protocol (PTP) timestamp associated with a first video frame of a serial digital interface (SDI) signal, and insert the PTP timestamp into at least one of a Vertical Ancillary (VANC) data space and a Horizontal Ancillary (HANC) data space of the first video frame.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments disclosed herein provide techniques to carry Precision Time Protocol (PTP) data in real-time video signals (e.g., a serial digital signal, also referred to as a serial digital interface (SDI) signal). A real-time video signal may be an active video stream that reflects changes in content as they occur. Embodiments disclosed herein carry PTP data (e.g., PTP timestamps) in the vertical ancillary (VANC) data space of a video and/or the horizontal ancillary (HANC) data space of the video. The PTP data may be carried using SMPTE 291M carriage and user-defined Data ID (DID) and Secondary Data ID (SDID) identifiers. SMPTE 291M provides the ability to apply and standardize new (e.g., user-defined) reference DID/SDID combinations. When stored in the VANC, the custom DID and SDID identifiers may record the 80 bits of precision PTP time data once per video frame, which would be accurate to the frame rate of the video (e.g., 60 frames per second). When stored in the HANC, the DID/SDID identifiers would be stored at a line rate (i.e, in the HANC data space of each line of the video), and the PTP time data would be accurate to the line rate (e.g., microseconds). Generally, the PTP timestamps are used to associate each frame of video (or each line of the video frame) with a time, facilitating production, archival, and search processes.

Figure 1:
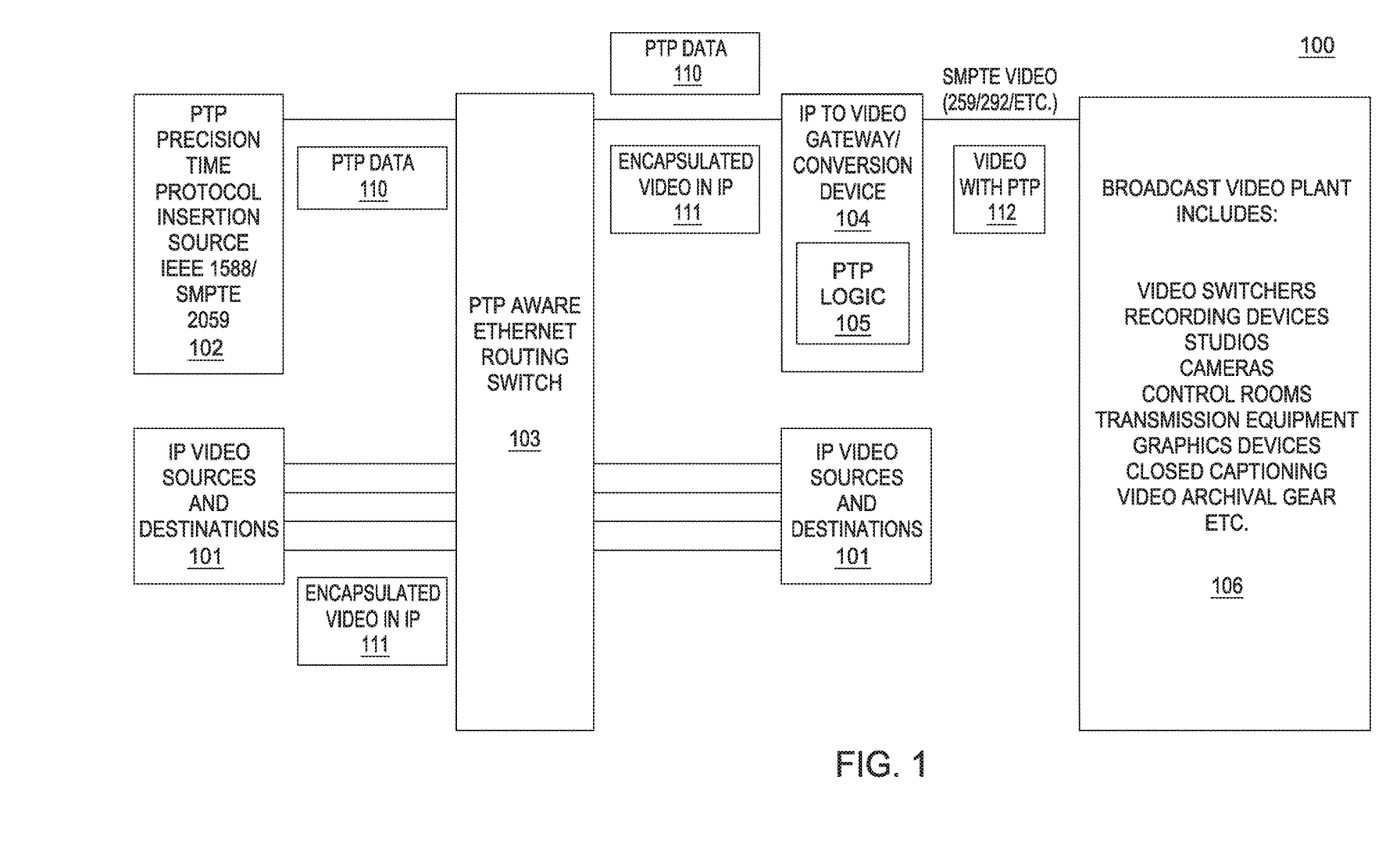
FIG. 1 illustrates a system configured to provide carriage of precision time PTP time reference data in a real-time video signal, according to one embodiment.

FIG. 1 illustrates a system 100 configured to provide carriage of precision time PTP time reference data in a real-time video signal, according to one embodiment. As shown, the system 100 includes a plurality of Internet Protocol (IP) video sources and destinations 101 connected by a PTP aware Ethernet routing switch 103. Examples of the IP video sources and destinations 101 include video cameras, storage devices, video displays, graphics insertion devices, transmit paths, computers, tablets, smart phones, and the like. As shown, the IP video sources and destinations 101 may transmit encapsulated video in IP 111, which may be video data stored in IP data packets. Furthermore, a PTP source 102 provides PTP data 110 to the switch 103. The PTP sources 102 include a GrandMaster clock, a Boundary Clock, and any other precision type clock using PTP protocols as defined by SMPTE 2059. The PTP source 102 provides an accurate time reference by continually communicating with all PTP aware devices in the path and characterizing the processing delays between devices, such as latency, that may happen in packetized switching networks. In at least one embodiment, the PTP data 110 is formatted as a stream of IP packets. The switch 103 may carry the PTP data 110 as additional load, which may be used by the switch 103 and/or other devices in the system 100 to calibrate their local clocks. For example, the PTP data 110 may include PTP timing messages which are used by devices in the system 100 to adjust (or synchronize, or, calibrate) their own clocks (not pictured) according to a reference time (which may be maintained by any clock device in the system 100, such as the PTP source 102). These devices may then be able to generate and insert precision PTP timestamps in the VANC and/or HANC of a SDI video signal (and/or IP packets that include video). Furthermore, when carried as a stream of IP packets, the switch 103 may create associations between the PTP data 110 and video encapsulated in IP packets 111 based on the times each are received. Generally, the associations are between IP packets 111 that encapsulate video and PTP timing data 110 that are received closest in time by the switch 103. For example, if a first video packet encapsulating video 111 and a first PTP data message 110 are received by the switch at t=0, the devices in the system 100 may associate the first video packet encapsulated in IP 111 with the first PTP data message 110 (rather than a second PTP data message 110 received at t=2, for example).

Often, video may transition between the IP domain to a video data domain (a video signal). Therefore, as shown, an IP to Video Gateway/Conversion device 104 is configured to receive the encapsulated video in IP 111 from the switch 103. Generally, the conversion device 104 is configured to convert the encapsulated video in IP packets 111 to a video signal (such as an SDI signal), and store PTP timestamps in the HANC and/or VANC of the frames of the video signal. Generally, such a conversion takes a packetized IP stream, which may have individual or combined Audio/Video/Metadata packets, and converts the packetized IP stream to a SDI signal as defined by SMPTE 292 (HD), SMPTE 259 (SD), SMPTE 2082 (UHD) or any other version of the SMPTE defined SDI interfaces.

As shown, the conversion device 104 includes PTP logic 105. The PTP logic 105 is configured to generate and insert PTP timestamps into the HANC and/or VANC of a video frame. The PTP timestamps may be inserted according to user-defined DID and SDID identifiers. In one embodiment, the PTP timestamps generated by the PTP logic 105 may be based on PTP timing messages associated with each IP packet 111. In another embodiment, the PTP logic 105 may generate PTP timestamps based on PTP reference packets (such as the timing messages in the PTP data 110 forwarded by the switch 103). More generally, the PTP logic 105 may use the timing messages in the PTP data 110 to generate one or more PTP timestamps for the SDI video frame. For example, the PTP logic 105 may compute a timestamp for the VANC and each line of the HANC of the video frame. As shown, the conversion device 104 produces video with PTP 112, which may be transmitted to a broadcast video plant 106, where the video with PTP 112 may be used in any way, such as modified in production, stored, and/or broadcasted.

Although not pictured, the PTP logic 105 may generate and insert PTP reference time stamps into the VANC and/or HANC of an existing serial digital interface (SDI) signal. In such embodiments, the IP to video gateway conversion device 104 does not perform a conversion from IP to SDI. Rather, the device 104 acts as an insertion device, generating and inserting the PTP reference timestamps in the VANC/HANC of the existing SDI signal.

In at least one embodiment, when stored in the VANC, the PTP timestamp may be stored in one line of the VANC section of a video frame. In such embodiments, the PTP logic 105 may generate a single PTP timestamp for each video frame. For example, the PTP timestamp may be stored in the first, second, or last line of the VANC. In at least one embodiment, when stored in the HANC, the PTP data is stored in the HANC space of each line of the video frame, providing line-accurate PTP timestamps in the SDI video signal. In such embodiments, the PTP logic 105 may generate a PTP timestamp for each line of each video frame.

Figure 2:
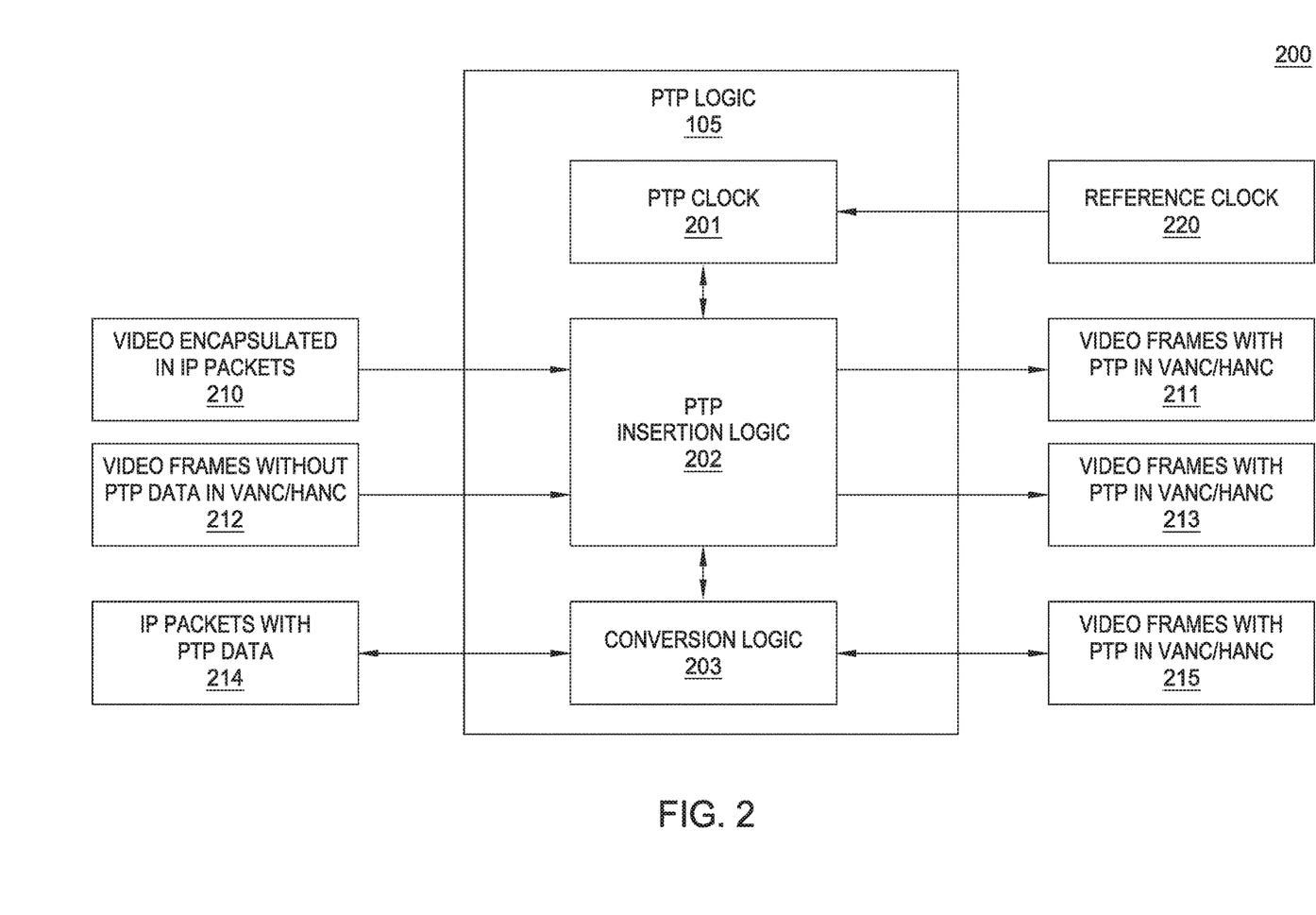
FIG. 2 illustrates components of an example PTP logic, according to one embodiment.

FIG. 2 illustrates components of the PTP logic 105, according to one embodiment. As shown, the PTP logic 105 includes a PTP clock 201, a PTP insertion logic 202, and a conversion logic 203. The PTP logic 105, the PTP insertion logic 202, and the conversion logic 203 may be hardware, software, or any combination thereof. The PTP clock 201 is a clock device configured to synchronize its time to a time of a reference (or master) clock 220 using the Precision Time Protocol. The PTP clock 201 may also generate PTP messages according to the PTP protocol. The reference clock 220 may be, for example and without limitation, a Grand-Master reference clock or a local Boundary Clock. The PTP insertion logic 202 is logic configured to generate and insert a PTP timestamp into the HANC and/or VANC of a video signal (or IP packets) based on the PTP messages provided by the PTP clock 201. The conversion logic 203 is configured to convert video encapsulated in IP packets to video frames and vice versa.

Therefore, as shown, the PTP logic 105 may receive video data encapsulated in IP packets 210. The PTP conversion logic 202 may then convert the video data encapsulated in the packets 210 to video frames (e.g., an SDI signal). The PTP clock 201 may generate PTP messages according to the PTP protocol. The PTP insertion logic 202 may then convert the message into a PTP timestamp. In another embodiment, the PTP insertion logic 202 may generate the timestamp based on associations between the each IP packet 110 and the PTP data 110. The PTP insertion logic 202 may then insert the PTP timestamp into the data space of the video frames, and output the video frames with PTP timestamps in the VANC and/or HANC 211. The video frames with PTP in VANC/HANC 211 is therefore an SDI signal carrying precision PTP data.

Similarly, the PTP insertion logic 202 may receive video frames without PTP in the VANC/HANC 212 (e.g., an SDI signal) and insert PTP timestamps in the VANC and/or HANC of the video frames to output the video frames with PTP data 213. Stated differently, the video frames without PTP in the VANC/HANC 112 are part of an existing SDI video signal, and are not contained in IP packets. Therefore, in such embodiments, the PTP logic 105 need not invoke the conversion logic 203 to convert the IP packets to an SDI video signal. Instead, the PTP insertion logic 202 generates and inserts the relevant PTP timestamps into the data space of the video frames without PTP in the VANC/HANC 212, and outputs the video frames with PTP in the VANC/HANC 213. In such embodiments, the video frames with PTP in the VANC/HANC 213 remain an SDI video signal. Further still, the PTP logic 105 (specifically, the conversion logic 203) may convert IP packets with PTP data 214 to video frames with PTP data in the VANC and/or HANC 215, and vice versa. In such embodiments, the PTP insertion logic 202 generates and inserts PTP timestamps in the video frames with PTP data in the VANC and/or HANC 215.

Figure 3A:
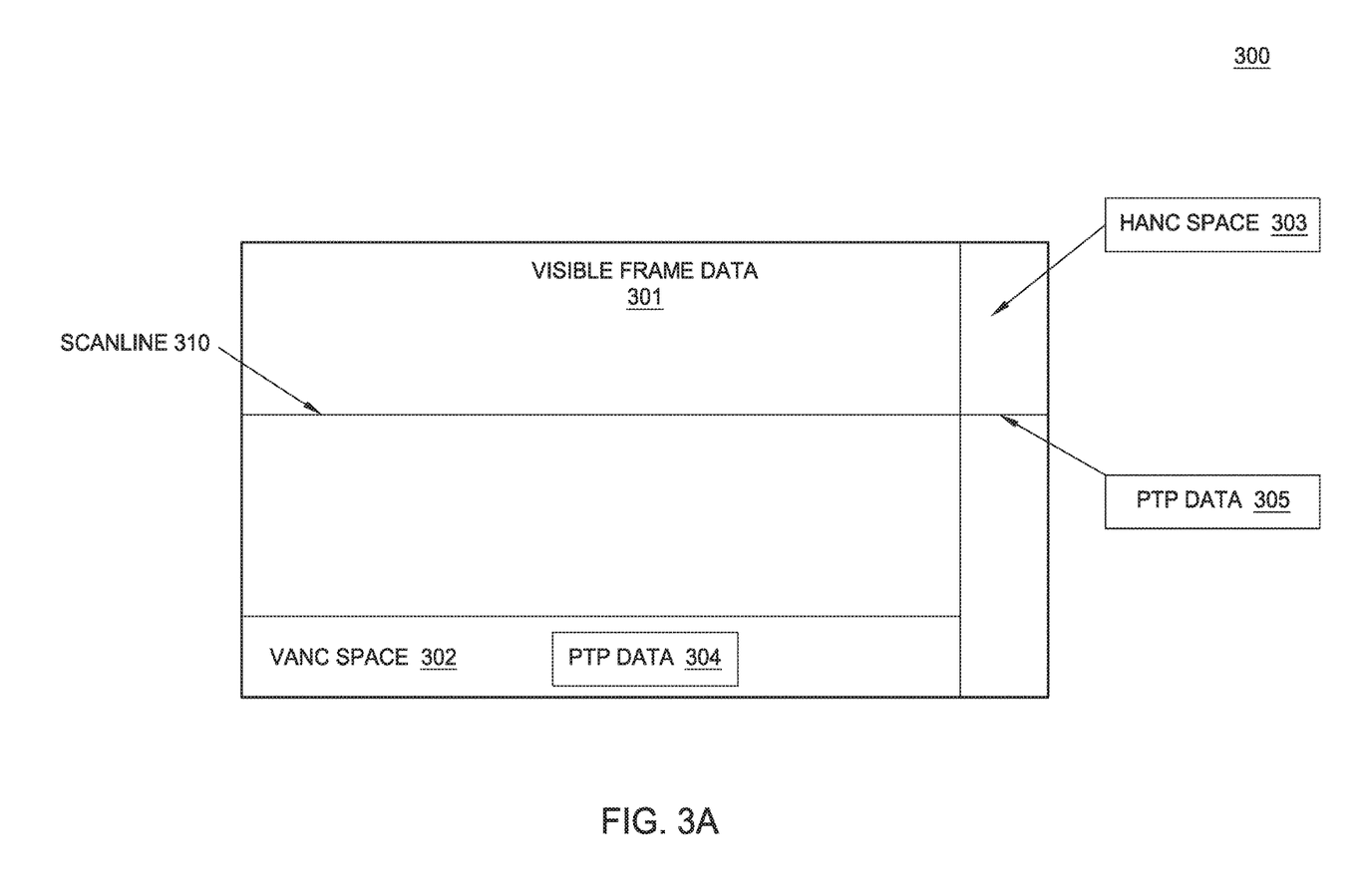
FIGS. 3A-3C are conceptual diagrams illustrating videos which include PTP data, according to one embodiment.

FIG. 3A is a conceptual diagram illustrating a video frame 300 which includes PTP data, according to one embodiment. As shown, video data is stored in a visible frame data 301 portion of the video frame 300. The visible frame data 301 is what may be outputted for display on a display device. When one type of HDTV format is used, a frame includes 750 scan lines with the visible frame data 301 occupying 720 scanlines and the VANC space 302 occupying 30 scan lines. In another type of HDTV format, a frame includes 1125 scan lines with 1080 visible scan lines. In one type of standard definition (SD) format is used 525 scan lines have 480 visible scan lines. Future higher resolution formats may include a predefined number of scan lines, with a subset of those scan lines being visible, and another subset being allocated to data space. The horizontal ancillary (HANC) space 303 is also included in the frame and stores audio data for each scan line of the frame. Furthermore, as shown, the VANC space 302 includes a PTP timestamp, namely the PTP data 304. The PTP data 304 may reflect a position of the video frame 300 relative to other video frames in a video, such as a time the video frame was 300 recorded, produced, stored, and the like. Similarly HANC space 303 includes one or more PTP timestamps, such as the PTP data 305. The PTP data 305 may reflect a timestamp when the scanline 310 was recorded, produced, stored, and the like. As previously indicated, PTP data 305 may be inserted for each scan line in the frame 300. Therefore, in such cases, the PTP data inserted in each scan line may reflect a sequence of when the scan lines were recorded. However, for the sake of clarity, the PTP data 305 is inserted in the scan line 310 in FIG. 3. Inserting the PTP data 304, 305 in the video frame 300 provides precise timing data for video frames (and scan lines thereof), which may be useful in production, distribution, archiving, and other solutions.

Figure 3B:
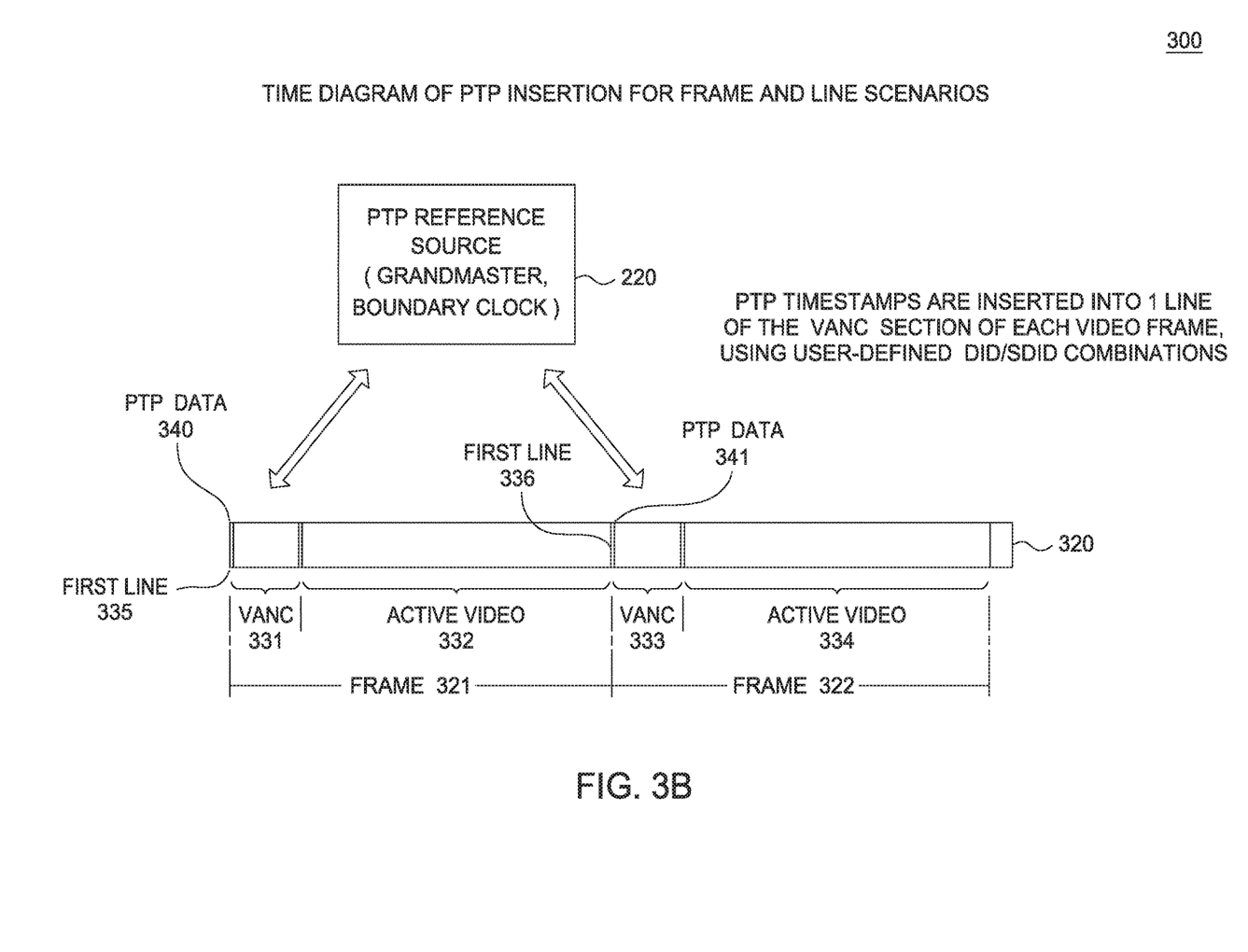

FIG. 3B illustrates an example SDI video signal 320 carrying PTP data in the VANC section of video frames, according to one embodiment. As shown, the video signal 320 includes two example video frames 321 and 322, although the video signal 320 may generally carry any number of video frames. As shown, each video frame 321, 322 includes a VANC portion 331 and 333, respectively, as well as an active video portion 332 and 334, respectively. The PTP logic 105 may generate and insert the PTP timestamps in the VANC portions 331, 333, of each video frame 321, 322. More specifically, as shown, the first line 335 of the video frame 321 (which is part of the VANC 331 of the video frame 321) includes the PTP data 340, which is a PTP timestamp formatted according to user-defined DID/SDID combinations. For example, SMPTE 291 provides a range of 50-5F (hexadecimal) values for user-defined DID values. Therefore, in one embodiment, a DID/SDID combination of 51/01 may identify the PTP timestamp. Similarly, the first line 336 of video frame 322 (which is part of the VANC 333 of the video frame 322) includes the PTP data 341. At the frame rate of the example depicted in FIG. 3B, the time between sequential time stamps would be approximately 16 milliseconds. Therefore, the timestamps generated by the PTP logic 105 and inserted in the PTP data 340, 341 would reflect a difference of approximately 16 milliseconds in absolute time.

Figure 3C:
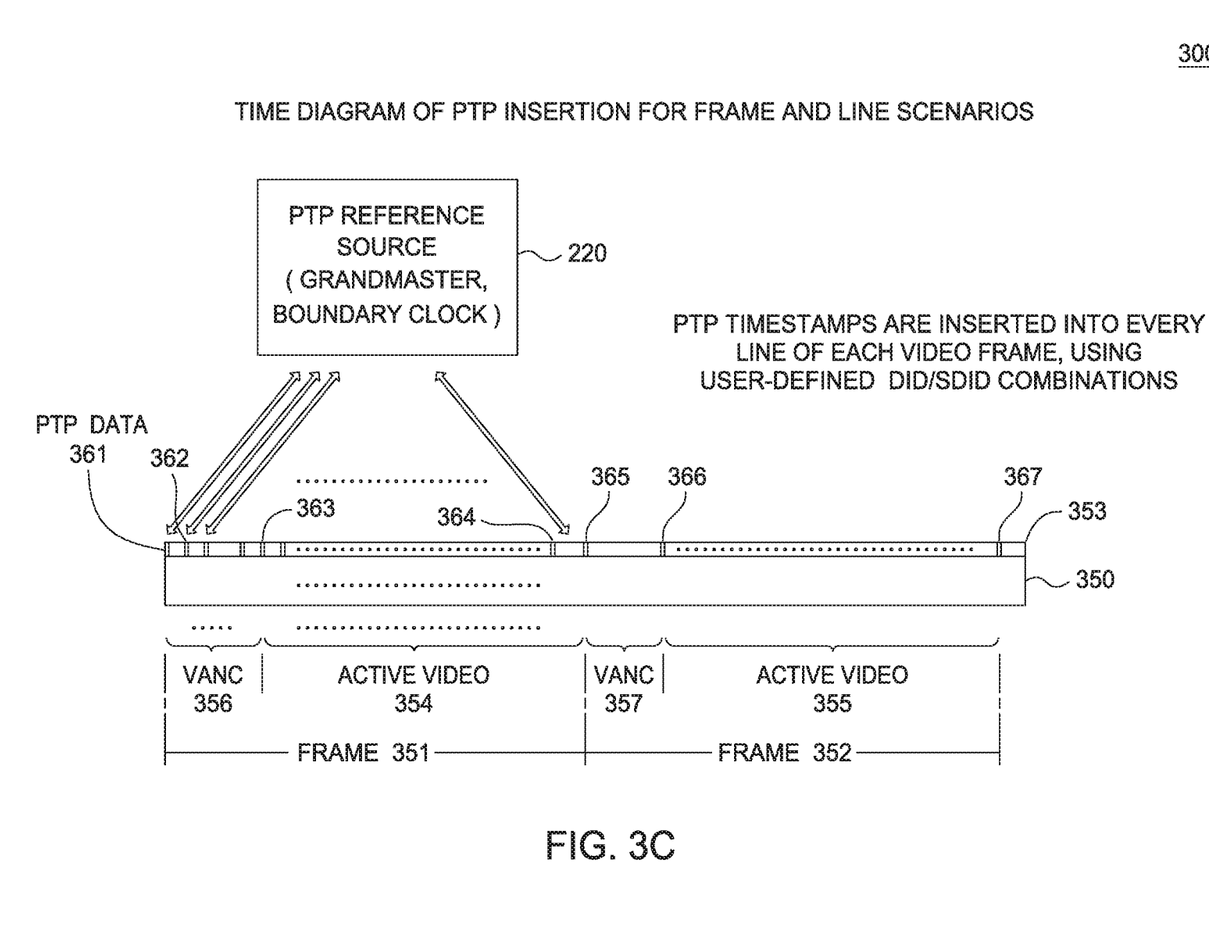

FIG. 3C illustrates an example SDI video signal 350 carrying PTP data in the HANC section of each line of a video frame, according to one embodiment. As shown, the video signal 350 includes two example video frames 351 and 352. Again, the video signal 350 may carry any number of video frames. As shown, each video frame 351, 352 includes a VANC portion 356 and 357, respectively, as well as an active video portion 354 and 355, respectively. Further still, FIG. 3C depicts the HANC section 353 of the video signal 350. In the embodiment depicted in FIG. 3C, the HANC section 353 for each line of each frame 351, 352 of the video signal 350 carries a respective PTP timestamp. The PTP logic 105 may generate and insert PTP timestamps in the HANC 353 of each video frame 321, 322. Therefore, if the frames 351, 352 include 750 scanlines (720 visible/active video, 30 VANC) the HANC portion 353 of each frame would include 750 PTP timestamps generated by the PTP logic 105. Similarly, if the frames 351, 352 include 1125 scanlines, the HANC portion 353 of each frame would include 1125 PTP timestamps generated and inserted by the PTP logic 105.

For the sake of clarity, each PTP timestamp in the HANC portion 353 is not depicted. However, as shown, the HANC portion 353 of each video frame 351, 352 includes PTP timestamps. More specifically, the HANC 353 of video frame 351 includes the example PTP data 361-364, representing four example PTP timestamps stored in the HANC 353. The PTP timestamps represented by the PTP data 361-364 may be formatted according to user-defined DID/SDID combinations. Similarly, the HANC 353 of video frame 352 includes the PTP data 366-367, which represent example PTP timestamps formatted according to user-defined DID/SDID combinations. At the line rate of the example depicted in FIG. 3C, the difference in sequential PTP timestamps would be roughly 22 microseconds. Therefore, sequential timestamps in each line of the HANC 353 would reflect the 22 microsecond difference in absolute time. For example, if the PTP data 361, 362 were associated with sequential scanlines in frame 351, the PTP timestamps in the PTP data 361, 362 would reflect approximately a 22 microsecond time difference.

Figure 4:
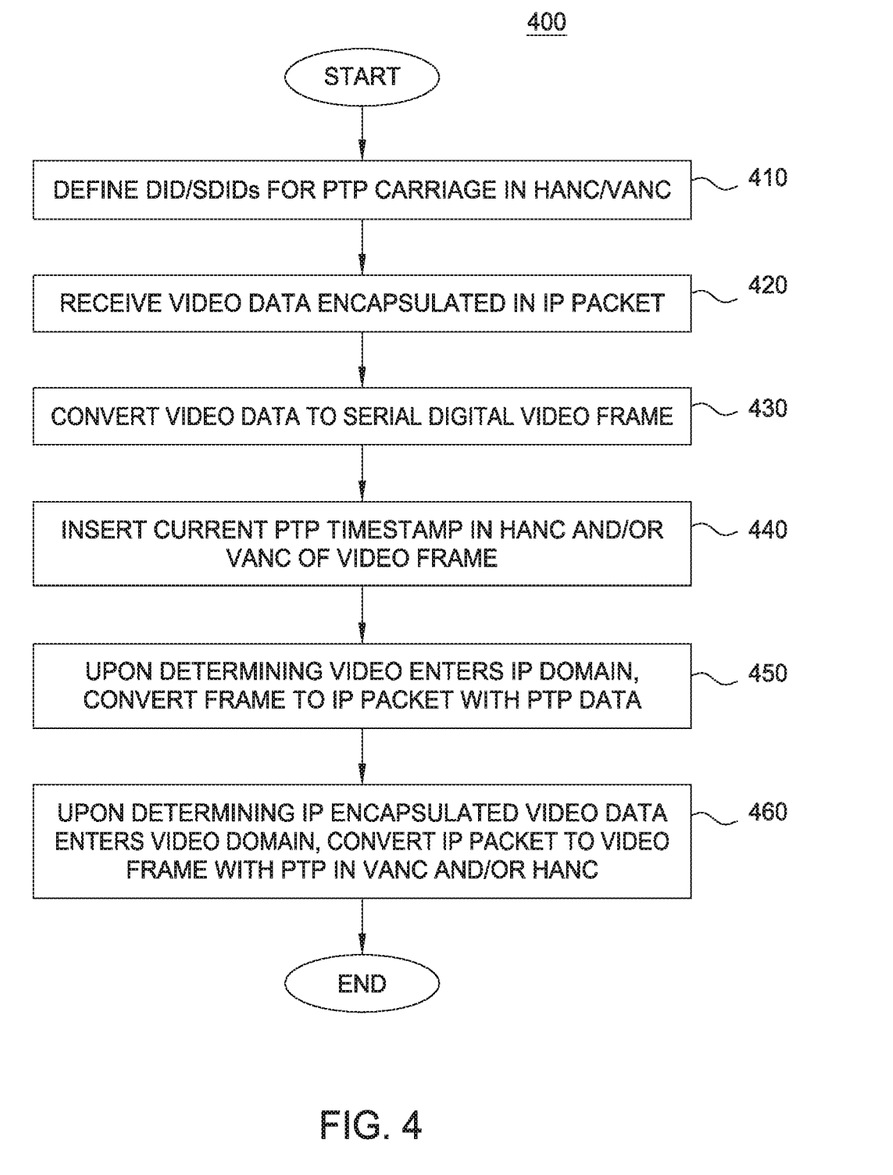
FIG. 4 illustrates a method to provide carriage of precision time PTP time reference data in a real-time video signal, according to one embodiment.

FIG. 4 illustrates a method 400 to provide carriage of PTP time reference data in a real-time video signal, according to one embodiment. Generally, the method 400 allows PTP timestamps to be carried in the VANC and/or HANC of a video signal. As shown, the method 400 begins at block 410, where DIDs and/or SDIDs are defined to record and carry the bits of precision PTP data. In at least one embodiment, the PTP data comprises 80 bits of information. At block 420, video data encapsulated in IP packets is received by, for example, the conversion device 104, or any other suitable device which includes logic similar to the PTP logic 105. At block 430, the conversion device 104 may convert the video data encapsulated in the IP packets to one or more serial digital video frames (e.g., an SDI signal).

At step 440, the conversion device 104 may insert a PTP timestamp in the HANC and/or VANC of the video frames generated at step 430. The conversion device 104 (or a component thereof, such as the PTP logic 105) may generate the PTP timestamp using the timing messages stored in the PTP data 110. In at least one embodiment, the PTP logic 105 generates the PTP timestamp based on associations between each IP packet and a corresponding PTP data 110. The PTP timestamp may be formatted according to the DIDs and SDIDs defined at block 410. For any given video frame, the inserted PTP timestamp may correspond to, for example, a time when the video frame was captured, modified, stored, and the like. The timestamps may provide temporal relationships between adjacent video frames. Although depicted as separate steps 430 and 440, in at least one embodiment, the PTP timestamps may be created and inserted when the video frames are created at step 430.

As previously indicated, however, the conversion device 104 may act as an insertion device, generating and inserting PTP timestamps into the HANC and/or VANC of the video frames in an existing SDI video stream. Since such video frames are received as an SDI signal, the conversion from IP to SDI is not required in these embodiments. Therefore, embodiments disclosed herein include the generation and insertion of a PTP timestamp in the VANC and/or HANC of video frames carried in an SDI signal. As previously indicated, when stored in the VANC, one or more PTP timestamps may be inserted into a given video frame. When stored in the HANC, the HANC space of each line of each frame carried by the video signal may include a PTP timestamp. Therefore, in such embodiments, the HANC of visible (e.g., active video) and non-visible scanlines (e.g., the VANC) include PTP timestamps.

At block 450, when the digital video re-enters the IP domain, the digital video frames may be converted to video encapsulated in IP packets, where the IP packet includes PTP data extracted from the HANC and/or VANC of the digital video frames. At block 460, when the IP encapsulated video data re-enters the video domain, the video data encapsulated in the IP packets may be converted to video frames that include PTP data in the VANC and/or HANC. Generally, any time video transitions between IP and the digital video domain, the method 400 may preserve the PTP data of the video by inserting PTP data in the VANC and/or HANC of the digital video frames. In at least one embodiment, the system may optionally overwrite the PTP timestamps with new clock information (e.g., new PTP timestamps). In another embodiment, the original timestamps may be preserved based on user preference and/or the specifics of a given application.

Figure 5:
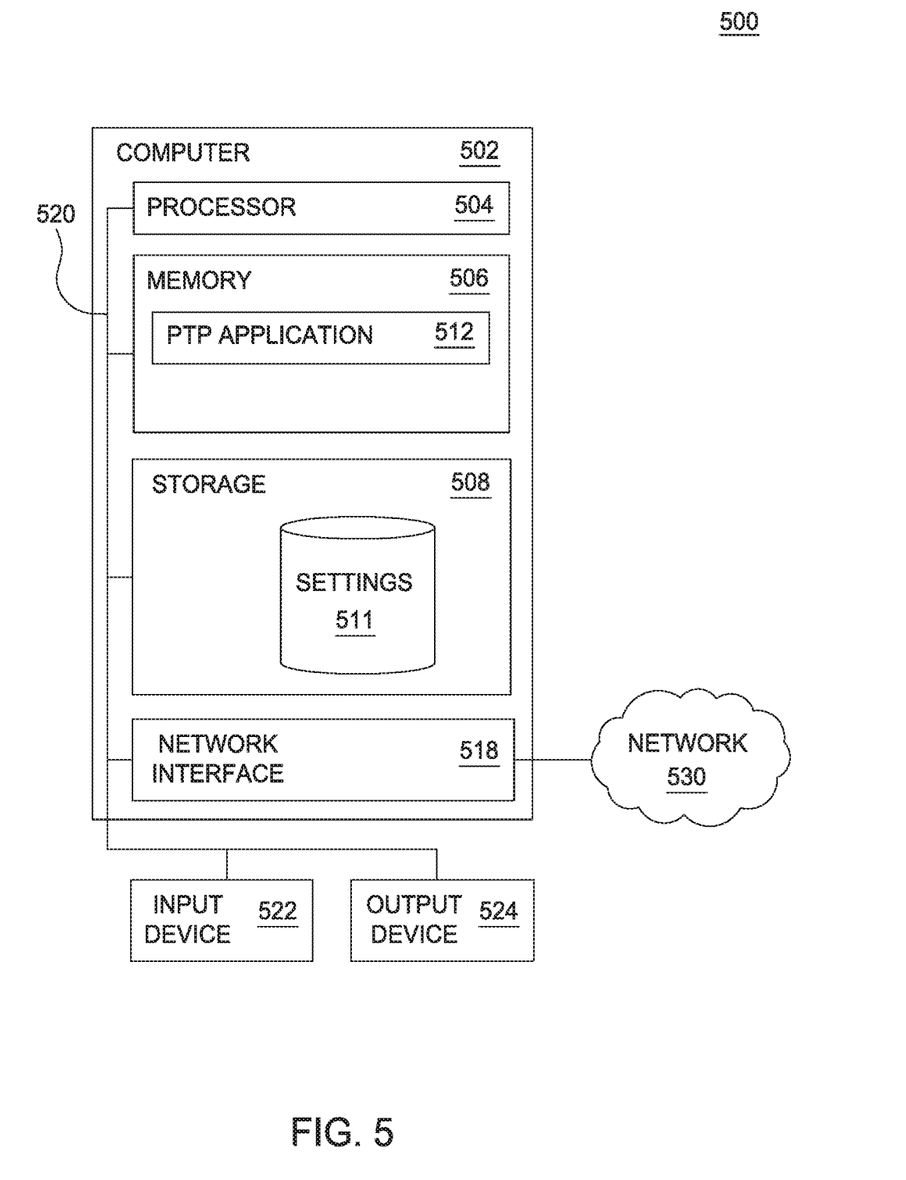
FIG. 5 illustrates a system configured to provide carriage of precision time PTP time reference data in a real-time video signal, according to one embodiment.

FIG. 5 illustrates a system 500 configured to provide carriage of precision time PTP time reference data in a real-time video signal, according to one embodiment. The networked system 500 includes a computer 502. The computer 502 may also be connected to other computers via a network 530. In general, the network 530 may be a telecommunications network and/or a wide area network (WAN). In a particular embodiment, the network 530 is the Internet.

The computer 502 generally includes a processor 504 which obtains instructions and data via a bus 520 from a memory 506 and/or a storage 508. The computer 502 may also include one or more network interface devices 518, input devices 522, and output devices 524 connected to the bus 520. The computer 502 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 518 may be any type of network communications device allowing the computer 502 to communicate with other computers via the network 530.

The storage 508 is representative of hard-disk drives, solid state drives, flash memory devices, optical media and the like. Generally, the storage 508 stores application programs and data for use by the computer 502. In addition, the memory 506 and the storage 508 may be considered to include memory physically located elsewhere; for example, on another computer coupled to the computer 502 via the bus 520.

The input device 522 may be any device for providing input to the computer 502. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the computer 502. The output device 524 may include output devices such as monitors, touch screen displays, and so on.

As shown, the memory 506 contains the PTP application 512, which is an application generally configured to generate and insert PTP timestamps in the VANC and/or HANC of a video frame carried in a serial digital video signal. When stored in the VANC, the PTP timestamp may be accurate to the frame rate, such as 30 frames per second or 60 frames per second. When stored in the VANC, such precision may be suitable for applications such as video archival/storage. When stored in the HANC, the DIDs/SDIDs are used to identify the carriage of the PTP timestamps, and are accurate to the line rate. The PTP data (e.g., a timestamp) may be generated based on timing messages from a network time source (such as the port of the network interface 518), and/or received from the system clock 519. The system clock 519 is a clock device configured to communicate via the PTP protocol and may be a GrandMaster reference clock or a local Boundary Clock. The system clock 519 may generate PTP timestamps using the PTP protocol. The PTP application 512 is further configured to convert video data that is encapsulated in IP packets to digital video frames, and vice versa, while preserving the PTP data associated with the video data. As shown, the storage 508 contains the settings 511, which includes user-defined custom DIDs and SDIDs used to format the PTP timestamps that are stored in the VANC and/or HANC of the video frames. More generally, the computer 502 is configured to incorporate all systems, methods, and apparatuses described above with reference to FIGS. 1-4.

Advantageously, embodiments disclosed herein preserve PTP data associated with video data that is carried in IP packets as the video data in the IP packets moves from the IP domain to the digital video domain. Without storing the PTP data in the VANC and/or HANC of digital video frames, the PTP data would be lost. Furthermore, archival, search, production and other applications may benefit from the availability of the precision time data.

In the foregoing, reference is made to embodiments of the disclosure. However, it should be understood that the disclosure is not limited to specific described embodiments. Instead, any combination of the recited features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the recited aspects, features, embodiments and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the PTP application 512 could execute on a computing system in the cloud and insert PTP timestamps in the VANC and/or HANC of video frames. In such a case, the PTP application 512 could store the video frames at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
generating, by a processor, a respective Precision Time Protocol (PTP) timestamp for each of a plurality of scanlines of a first video frame of a serial digital interface (SDI) signal, wherein each PTP timestamp is associated with a respective time of the respective scanline;
inserting the respective PTP timestamp into a Horizontal Ancillary (HANC) data space of the respective scanline of the first video frame;
receiving a first network message, wherein the first network message includes at least a portion of the scanlines of the first video frame and the associated PTP timestamps; and
converting the scanlines of the first network message to a second video frame, wherein the second video frame includes the PTP timestamps of the first network message stored in a HANC data space of a respective scanline of the second video frame.

2. The method of claim 1, wherein the PTP timestamps are formatted according to at least one of a user-defined Data ID (DID) and a Secondary Data ID (SDID) identifier.

3. The method of claim 1, wherein the first video frame is received as a video data of at least a first internet protocol (IP) packet prior to generating the PTP timestamps, the method further comprising:
converting the video data of the first IP packet to the SDI signal prior to generating the PTP timestamps.

4. The method of claim 3, wherein the PTP timestamps are generated based on: (i) PTP synchronization data received from a PTP grandmaster clock via a network, (ii) PTP synchronization data received from a PTP boundary clock via the network, and (iii) PTP synchronization data associated with the first IP packet.

5. The method of claim 1, wherein the plurality of scanlines comprise visible scanlines and non-visible scanlines.

6. The method of claim 1, wherein at least one of the PTP timestamps is further inserted in a vertical ancillary (VANC) data space of the first video frame.

7. A non-transitory computer-readable storage medium having computer-readable program code embodied therewith, the computer-readable program code executable by a processor to perform an operation comprising:
generating, by a processor, a respective Precision Time Protocol (PTP) timestamp for each of a plurality of scanlines of a first video frame of a serial digital interface (SDI) signal, wherein each PTP timestamp is associated with a respective time of the respective scanline;
inserting the respective PTP timestamp into a Horizontal Ancillary (HANC) data space of the respective scanline of the first video frame;
receiving a first network message, wherein the first network message includes at least a portion of the scanlines of the first video frame and the associated PTP timestamps; and
converting the scanlines of the first network message to a second video frame, wherein the second video frame includes the PTP timestamps of the first network message stored in a HANC data space of a respective scanline of the second video frame.

8. The non-transitory computer-readable storage medium of claim 7, wherein the PTP timestamps are formatted according to at least one of a user-defined Data ID (DID) and a Secondary Data ID (SDID) identifier.

9. The non-transitory computer-readable storage medium of claim 7, wherein the first video frame is received as a video data of at least a first internet protocol (IP) packet prior to generating the PTP timestamp, wherein the PTP timestamps are generated based on: (i) PTP synchronization data received from a PTP grandmaster clock via a network, (ii) PTP synchronization data received from a PTP boundary clock via the network, and (iii) PTP synchronization data associated with the first IP packet, the operation further comprising: converting the video data of the first IP packet to the SDI signal prior to generating the PTP timestamps.

10. The non-transitory computer-readable storage medium of claim 7, wherein the plurality of scanlines comprise visible scanlines and non-visible scanlines.

11. The non-transitory computer-readable storage medium of claim 7, wherein at least one of the PTP timestamps is further inserted in a vertical ancillary (VANC) data space of the first video frame.

12. An apparatus, comprising:
a processor; and
a memory containing a program which when executed by the processor performs an operation comprising:
generating a respective Precision Time Protocol (PTP) timestamp for each of a plurality of scanlines of a first video frame of a serial digital interface (SDI) signal, wherein each PTP timestamp is associated with a respective time of the respective scanline;
inserting the respective PTP timestamp into a Horizontal Ancillary (HANC) data space of the respective scanline of the first video frame;
receiving a first network message, wherein the first network message includes at least a portion of the scanlines of the first video frame and the associated PTP timestamps; and
converting the scanlines of the first network message to a second video frame, wherein the second video frame includes the PTP timestamps of the first network message stored in a HANC data space of a respective scanline of the second video frame.

13. The apparatus of claim 12, wherein the PTP timestamps are formatted according to at least one of a user-defined Data ID (DID) and a Secondary Data ID (SDID) identifier.

14. The apparatus of claim 12, wherein the first video frame is received as a video data of at least a first internet protocol (IP) packet prior to generating the PTP timestamp, wherein the operation further comprises:
converting the video data of the first IP packet to the SDI signal prior to generating the PTP timestamps.

15. The apparatus of claim 14, wherein the PTP timestamps are generated based on: (i) PTP synchronization data received from a PTP grandmaster clock via a network, (ii) PTP synchronization data received from a PTP boundary clock via the network, and (iii) PTP synchronization data associated with the first IP packet.

16. The apparatus of claim 12, wherein the plurality of scanlines comprise visible scanlines and non-visible scanlines.

17. The apparatus of claim 12, wherein at least one of the PTP timestamps is further inserted in a vertical ancillary (VANC) data space of the first video frame.

\* \* \* \* \*

UNITED STATES PATENT AND TRADEMARK OFFICE
CERTIFICATE OF CORRECTION

PATENT NO. : 10,097,790 B2  
APPLICATION NO. : 15/071065  
DATED : October 9, 2018  
INVENTOR(S) : Michael J. Strein Page 1 of 1

It is certified that error appears in the above-identified patent and that said Letters Patent is hereby corrected as shown below:

On the Title Page

Column 1, below " (*) Notice: Subject to any disclaimer, the term of this patent is extended or adjusted under 35 U.S.C. 154(b) by 84 days. " delete "This patent is subject to a terminal disclaimer.".

Column 2, under "Date of Patent", delete "*Oct. 9, 2018" and insert -- Oct. 9, 2018 --, therefor.

In the Specification

In Column 8, Line 66, delete ""system."Furthermore," and insert -- "system." Furthermore, --, therefor.

Signed and Sealed this  
Fifth Day of March, 2019

Andrei Iancu  
*Director of the United States Patent and Trademark Office*